United States Patent
Li et al.

(10) Patent No.: US 12,498,952 B2
(45) Date of Patent: Dec. 16, 2025

(54) REQUEST-RESPONSE BASED PARAVIRTUALIZED I/O SYSTEM AND METHOD

(71) Applicant: SHANGHAI JIAO TONG UNIVERSITY, Shanghai (CN)

(72) Inventors: Jian Li, Shanghai (CN); Xiaokang Hu, Shanghai (CN); Ruhui Ma, Shanghai (CN); Haibing Guan, Shanghai (CN)

(73) Assignee: Shanghai Jiao Tong University (CN)

( * ) Notice: Subject to any disclaimer, the term of this patent is extended or adjusted under 35 U.S.C. 154(b) by 846 days.

(21) Appl. No.: 17/844,532

(22) Filed: Jun. 20, 2022

(65) Prior Publication Data

US 2022/0350635 A1    Nov. 3, 2022

Related U.S. Application Data

(63) Continuation-in-part of application No. PCT/CN2020/111207, filed on Aug. 26, 2020.

(30) Foreign Application Priority Data

Dec. 20, 2019   (CN) .......................... 201911327442.6

(51) Int. Cl.
  *G06F 9/455*   (2018.01)
(52) U.S. Cl.
  CPC ............... *G06F 9/45558* (2013.01); *G06F 2009/45595* (2013.01)
(58) Field of Classification Search
  CPC .............. G06F 9/45558; G06F 2009/45595
  See application file for complete search history.

(56) References Cited

U.S. PATENT DOCUMENTS 10,846,124 B2   11/2020   Ni et al.
2004/0123169 A1   6/2004   Elnozahy et al.
(Continued)

FOREIGN PATENT DOCUMENTS

CN   1508652 A   6/2004
CN   106095580 A   11/2016
(Continued)

OTHER PUBLICATIONS

International Search Report dated Nov. 30, 2020, for Application No. PCT/CN2020/111207 and translation.
(Continued)

*Primary Examiner* — Tammy E Lee
(74) *Attorney, Agent, or Firm* — Conley Rose, P.C.

(57) ABSTRACT

A request-response based paravirtualized I/O system and method relating to the fields of virtualization and cloud computing includes a request-response application, a front-end drive module and a back-end drive module. The front-end drive module and the back-end drive module interact by means of a transmit queue and a receive queue. The request-response application generates an I/O request, and the front-end drive module writes the I/O request into the transmit queue. The system has two operating modes: a notification mode and a polling mode. The system operates by default in the notification mode. When the request-response application issues a connection establishment or service request, the system switches to the polling mode. This system and method introduce an optimistic polling mechanism, combine the advantages of the notification mode and the polling mode, reduce the number of VM exits and decrease wasting of computing resources, thus improving data path performance.

15 Claims, 4 Drawing Sheets

(56) References Cited

U.S. PATENT DOCUMENTS

| | | | | |
|---|---|---|---|---|
| 2013/0138760 | A1* | 5/2013 | Tsirkin | G06F 9/546 |
| | | | | 709/213 |
| 2018/0285021 | A1* | 10/2018 | Akaike | G06F 3/0656 |
| 2018/0357089 | A1 | 12/2018 | Tsirkin | |
| 2019/0377593 | A1* | 12/2019 | Ni | G06F 9/45558 |
| 2020/0097314 | A1* | 3/2020 | Xie | G06F 9/45558 |

FOREIGN PATENT DOCUMENTS

| | | |
|---|---|---|
| CN | 105099526 B | 12/2017 |
| CN | 104618158 B | 5/2018 |
| CN | 108845863 A | 11/2018 |
| CN | 110262910 A | 9/2019 |
| CN | 111143032 A | 5/2020 |
| WO | 2015/089824 A1 | 6/2015 |
| WO | 2019/091361 A1 | 5/2019 |

OTHER PUBLICATIONS

Chinese Office Action dated Mar. 1, 2024, for Application No. CN201911327442.6.

\* cited by examiner

REQUEST-RESPONSE BASED PARAVIRTUALIZED I/O SYSTEM AND METHOD

CROSS-REFERENCE TO RELATED APPLICATIONS

This application is a continuation-in-part (CIP) application claiming benefit of PCT/CN2020/111207 filed on Aug. 26, 2020, which claims priority to Chinese Patent Application No. 201911327442.6 filed on Dec. 20, 2019, the disclosures of which are incorporated herein in their entirety by reference.

FIELD OF THE INVENTION

The present invention relates to the fields of virtualization and cloud computing, and particularly to a request-response based paravirtualized I/O system and method.

DESCRIPTION OF THE PRIOR ART

I/O virtualization is one of the important supporting technologies for cloud infrastructure. With surging increases of network traffic in cloud data centers, guaranteeing the performance of I/O virtualization has become a key issue. Generally speaking, communication between virtual machines and their I/O devices can be divided into a data path and an event path. Prior studies, such as shared memory I/O ring, zero copy transmission and DMA virtual address translation, have greatly reduced the performance overhead of the data path. Currently, the main performance bottlenecks lie in the data path: frequent virtual machine monitor (VMM) interventions cause numerous, costly VM exits.

Virtual interrupt delivery from virtual I/O devices to virtual machines is one of the major sources of VM exits. However, for a paravirtualized I/O model, I/O requests from virtual machines will also cause a great number of VM exits. Paravirtualized I/O is one of today's most popular I/O virtualization models. It achieves a good balance between performance and flexibility, and essentially consists of two parts: the first part is front-end drive modules at guests (i.e., a virtual machines); and the second part is a back-end drive module at a host (i.e., a VMM), which generally corresponds to one I/O thread. For a paravirtualized network card, between the front and back ends, by means of a transmit queue and a receive queue, interaction is carried out. When a virtual machine generates an I/O request, the front-end drive writes the I/O request into the transmit queue and then notifies the back-end drive. The notification will trigger a VM exit, and the VMN will schedule a back-end I/O thread for acquiring data from the transmit queue and transmitting it to the outside.

For paravirtualized I/O, if virtual machines issue a lot of I/O requests, numerous VM exits will be generated, affecting system performance. Existing solutions are mainly divided into two types: the first type substitutes a polling mode for the existing notification mode, which disables the front-end drive's notification mechanism, with the back-end I/O thread constantly polling whether there is data in the transmit queue. Although this approach can eliminate VM exits, under low I/O load (infrequent virtual machine I/O activities), it tends to cause a waste of computing resources. The second type, according to virtual machine I/O load, automatically switches between the notification mode and the polling mode, combing the advantages of both the two modes to reduce the number of VM exits and minimize wasting of computing resources. However, this type of solutions, which though sensing virtual machine I/O load, switch between the notification mode and the polling mode, cannot predict when a virtual machine will issue an I/O request, but can only sense issued I/O requests to choose a mode.

Therefore, those skilled in the art are directing their effort toward developing a request-response based paravirtualized I/O system and method based on the prediction of I/O requests.

SUMMARY OF THE INVENTION

In view of the above described shortcomings of the prior art, the technical problem to be solved by the present invention is the problem that virtual machines issue a lot of I/O requests which lead to numerous VM exits, affecting system performance.

Basically, all I/O requests are triggered by request-response applications upon their receipt of packets. Here, the received packets may be connection establishment requests or service requests from users. The inventors have found through analysis that I/O requests from request-response applications correspond to packets that are sent to users as responses. Based on this characteristic, I/O request from a virtual machine deployed with a request-response application can be predicted to a certain extent. On this basis, the present invention introduces a polling mechanism to eliminate VM exits caused by I/O requests from a virtual machine.

In order to achieve the above goal, the present invention provides a request-response based paravirtualized I/O system and method.

A request-response based paravirtualized I/O system includes a request-response application, a front-end drive module and a back-end drive module. The front-end drive module and the back-end drive module interact by means of a transmit queue and a receive queue. The request-response application generates an I/O request, and the front-end drive module writes the I/O request into the transmit queue. The back-end drive module performs, on the transmit queue, polling, preferably optimistic polling. The back-end drive module, from a physical network card, receives a packet.

Optionally, the request-response application and the front-end drive module are located at a guest.

Further, the guest is a virtual machine (VM).

Optionally, the back-end drive module is located at a host.

Further, the host is a virtual machine monitor (VMM).

Optionally, the back-end drive module corresponds to one I/O thread.

Optionally, at the very beginning of operation of the system, by default under low load, the system operates in the notification mode. When the request-response application generates an I/O request, the front-end drive module writes the I/O request into the transmit queue, and then notifies the back-end drive module. The back-end drive module acquires the I/O request from the transmit queue and transmits it to the outside.

Optionally, the request-response application establishes a connection or service request, and the system switches to a polling mode for operation. The back-end drive module employs a polling mechanism, preferably optimistic polling, periodically detects the I/O request in the transmit queue.

A request-response based paravirtualized I/O method switches an operating mode of a paravirtualized I/O system according to particular circumstances and includes the steps of:

S100: setting the system to operate by default under low load in the notification mode;

S200: when the request-response application establishes a connection or service request, switching the system to the polling mode for operation;

S300: the back-end drive module performing a polling operation, preferably optimistic polling;

S400: the back-end drive module receiving a new packet and re-initializing a polling count which is preferred to be a total number of polling times or a count of timestamps;

S500: determining that the polling count reaches a set threshold, quitting the polling mode and returning to step S100.

Optionally, step S200 further comprises:

S201: the request-response application establishing the connection or service request;

S202: the back-end drive module disabling a notification mechanism of the front-end drive module;

S203: the back-end drive module initializing the polling count;

S204: the back-end drive module handling the I/O request in the transmit queue.

Optionally, step S300 further comprises:

S301: the back-end drive module handling a received packet;

S302: the back-end drive module handling the I/O request in the transmit queue;

S303: polling the I/O request in the transmit queue, polling being preferred to be optimistic polling;

S304: if there is the I/O request in the transmit queue, then handling it; if there is not, then accumulating the polling count.

Optionally, step S500 further comprises:

S501: the back-end drive module performing a polling operation and accumulating the polling count;

S502: determining the polling count;

S503: if the polling count has exceeded the set threshold, the back-end drive module enabling the notification mechanism of the front-end drive, quitting the polling mode and returning to step S100.

The present invention introduces an optimistic polling mechanism, combines the advantages of the notification mode and the polling mode, reduces the number of VM exits and decreases wasting of computing resources, thus improving data path performance.

Below, the concept, structural details and resulting technical effects of the present invention will be further described with reference to the accompanying drawings to provide a full understanding of the objects, features and effects of the invention.

DETAILED DESCRIPTION OF THE PREFERRED EMBODIMENTS

Figure 1:
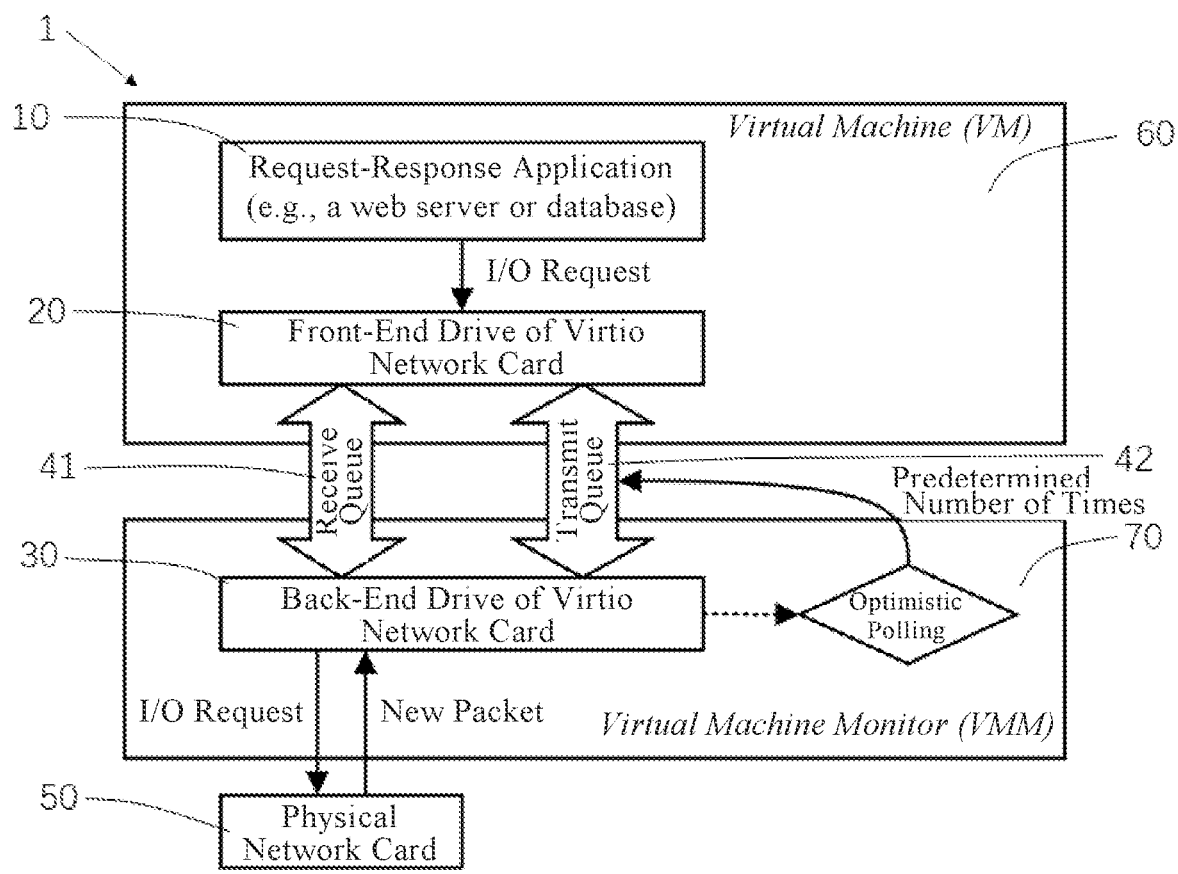
FIG. 1 is a schematic diagram showing the structure of a preferred embodiment of the present invention.

Below, the accompanying drawings of this specification are referenced to introduce many preferred embodiments of the present invention so that the techniques thereof become more apparent and readily understood. The present invention may be embodied in many different forms of embodiment, and the protection scope of the invention is not limited only to the embodiments mentioned herein.

Throughout the accompanying drawings, structurally identical parts are indicated with identical reference numerals, and structurally or functionally similar components are indicated with similar reference numerals. The size and thickness of each component in the drawings are arbitrarily depicted, and the present invention is not limited to any size or thickness of each component. For greater clarity of illustration, the thicknesses of some parts are exaggerated as appropriate somewhere in the drawings.

In order to solve the problem that virtual machines issue a lot of I/O requests which lead to numerous VM exits, affecting system performance, the inventors have designed a request-response based paravirtualized I/O system 1 including a request-response application 10, a front-end drive module 20 and a back-end drive module 30. The front-end drive module 20 and the back-end drive module 30 interact by means of a transmit queue 42 and a receive queue 41. The request-response application 10 generates an I/O request. The front-end drive module 20 writes the I/O request into the transmit queue 42. The back-end drive module 30 optimistically polls the transmit queue 42. The back-end drive module 30, from a physical network card 50, receives a packet.

As shown in FIG. 1, the present embodiment is a KVM-based virtio paravirtualized I/O model. The request-response application 10 is a web server or database. The front-end drive module 20 is a front-end drive of a virtio network card located at a virtual machine (VM) 60. The back-end drive module 30 is a back-end drive of the virtio network card located at a virtual machine monitor (VMM) 70. The front-end drive of the virtio network card and the back-end drive of the virtio network card interact by means of a transmit queue 42 and a receive queue 41. The request-response application 10 (web server or database) generates an I/O request. The front-end drive of the virtio network card writes the I/O request into the transmit queue 42. The back-end drive of the virtio network card optimistically polls the transmit queue 42. The back-end drive of the virtio network card, from a physical network card 50, receives a packet.

Figure 2:
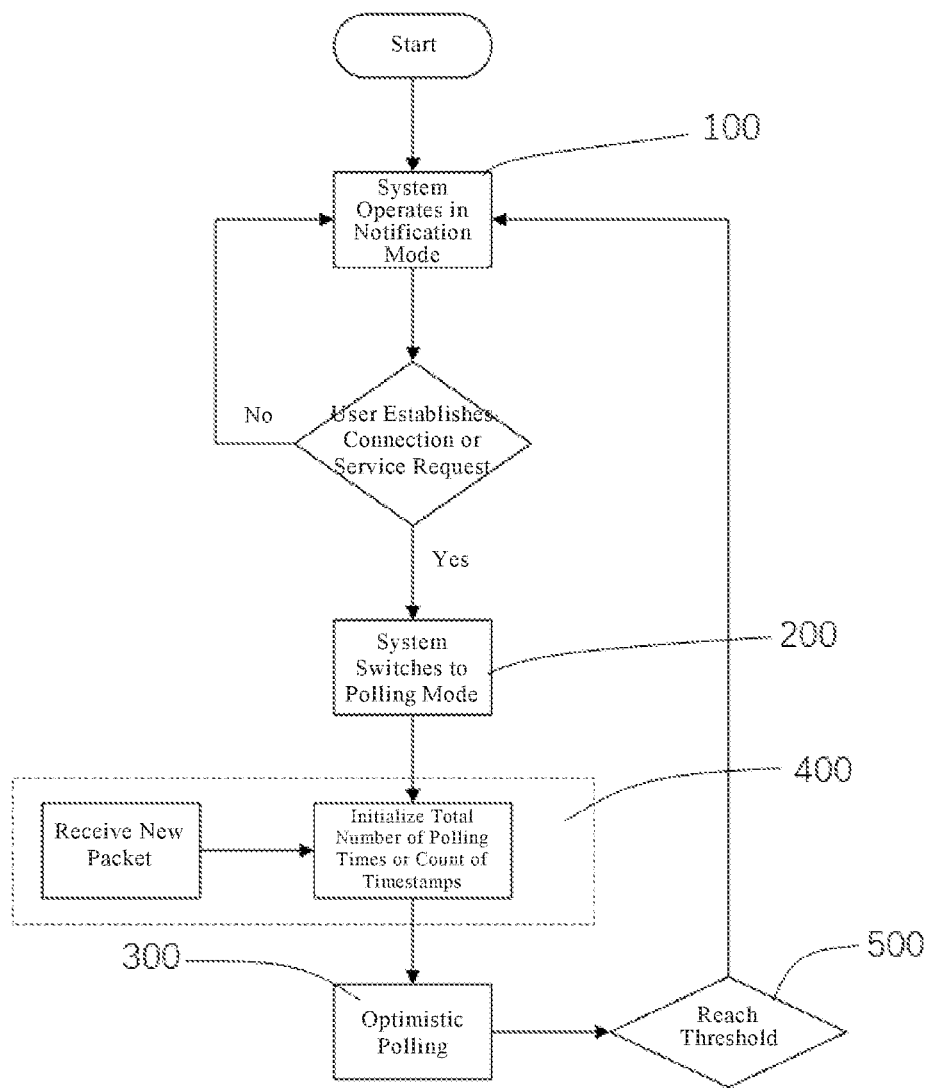
FIG. 2 is a schematic diagram showing a process according to another preferred embodiment of the present invention.

On the basis of the above embodiment, the inventors have further designed a request-response based paravirtualized I/O method which, as shown in FIG. 2, includes the steps of:

S100: the system 1 operating by default under low load in a notification mode;

S200: when the request-response application 10 establishes a connection or service request, the system 1 switching to a polling mode for operation;

S300: the back-end drive module 30 performing an optimistic polling operation and, prior to the optimistic polling, initializing a total number of polling times;

S400: the back-end drive module 30 receiving a new packet, re-initializing the total number of polling times or a count of timestamps, and continuing the optimistic polling;

S500: determining that the total number of polling times or the count of timestamps reaches a set threshold, quitting the polling mode, returning to step S100.

Figure 3:
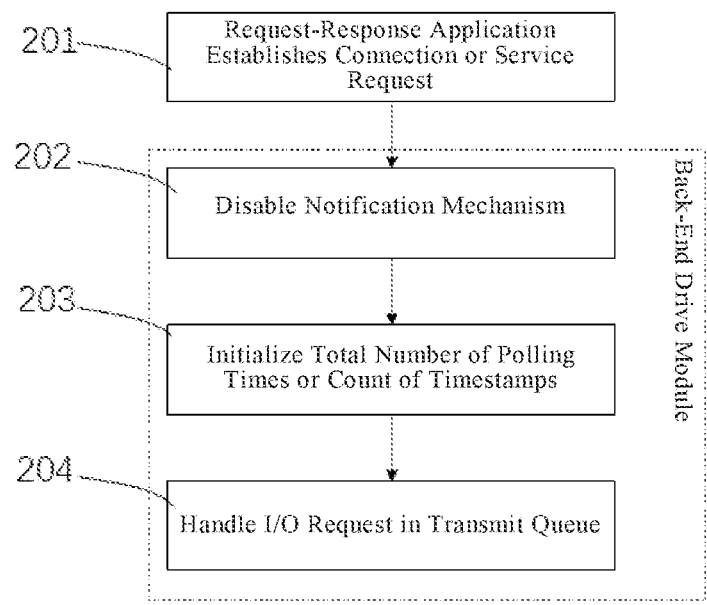
FIG. 3 is a schematic diagram showing an operating mode switching process according to the present invention.

For step S200, as shown in FIG. 3, the inventors have made the refinements:
S201: the request-response application 10 establishing the connection or service request;
S202, the back-end drive module 30 disabling a notification mechanism of the front-end drive module 20;
S203: the back-end drive module 30 initializing the total number of polling times or the count of timestamps;
S204: the back-end drive module 30 handling the I/O request in the transmit queue.

Figure 4:
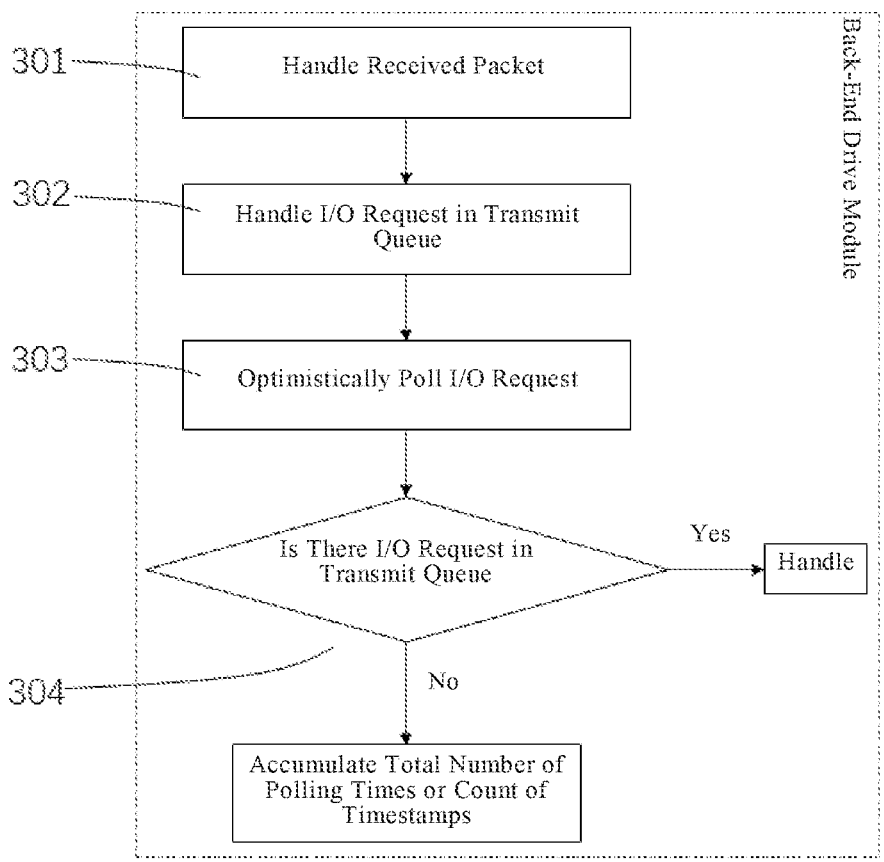
FIG. 4 is a schematic diagram showing an optimistic polling process according to the present invention.

For step S300, as shown in FIG. 4, the inventors have made the refinements:
S301: the back-end drive module 30 handling the received packet;
S302: the back-end drive module 30 handling the I/O request in the transmit queue 42;
S303: optimistically polling the I/O request in the transmit queue 42;
S304: if there is an I/O request in the transmit queue 42, then handling it; if there is not, then accumulating the total number of polling times or the count of timestamps.

Figure 5:
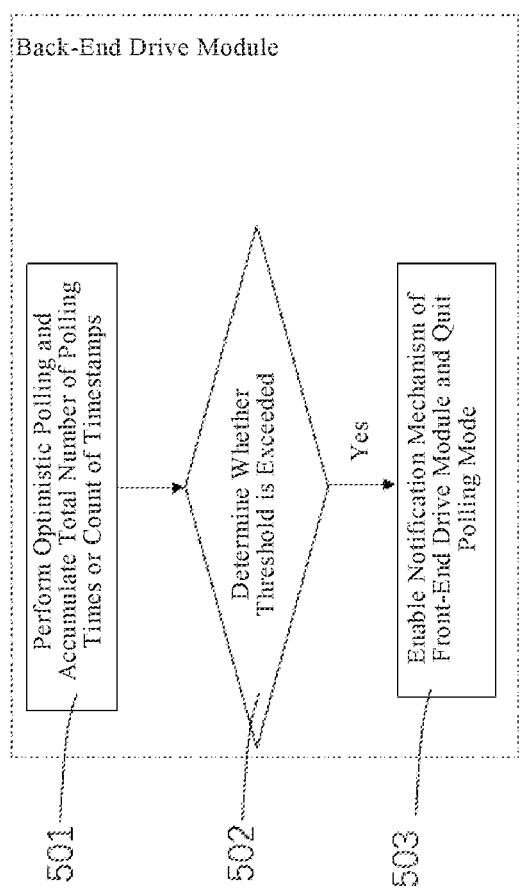
FIG. 5 is a schematic diagram showing a process of quitting a polling mode according to the present invention.

For step S500, as shown in FIG. 5, the inventors have made the refinements:
S501: the back-end drive module 30 performing the optimistic polling operation and accumulating the number of polling times;
S502: determining the total number of polling times or the count of timestamps;
S503: if the total number of polling times or the count of timestamps has exceeded the set threshold, the back-end drive module 30 enabling the notification mechanism of the front-end drive module 20, quitting the polling mode, returning to step S100.

Preferred specific embodiments have been described in detail above. It is to be understood that, those of ordinary skill in the art, without the need for creative effort, can make various modifications and changes, based on the concept of the present invention. Accordingly, all the technical solutions that can be obtained by those skilled in the art by logical analysis, inference or limited experimentation in accordance with the concept of the invention on the basis of the prior art are intended to fall within the protection scope as defined by the claims.

The invention claimed is:

1. A request-response based paravirtualized I/O system comprising:
a physical network card;
a request-response application;
a front-end drive module; and
a back-end drive module, the front-end drive module and the back-end drive module interacting by means of a transmit queue and a receive queue;
wherein operating modes of the system including a notification mode and a polling mode;
the notification mode referring to, when the request-response application generates an I/O request, the front-end drive module writing the I/O request into the transmit queue and then notifying the back-end drive module, the back-end drive module acquiring the I/O request from the transmit queue and transmitting it to an external network via the physical network card;
the polling mode referring to, when the request-response application generates the I/O request, the front-end drive module writing the I/O request into the transmit queue, the back-end drive module employing a polling operation to periodically detect the I/O request in the transmit queue; and
the system operating by default in the notification mode, when the request-response application issues a connection establishment or service request, the system switching to the polling mode for operation, when a polling count reaches a set threshold, the system quitting the polling mode and returning to the notification mode; wherein the polling count is one selected from a total number of polling times and a count of timestamps; and
wherein the system, in response to the connection establishment or service request issued by the request-response application, switches from the notification mode to the polling mode, wherein the back-end drive module is configured to perform the polling operation, and when receiving a new packet from the external network via the physical network card, re-initialize the polling count and, after determining the polling count reaching the set threshold, quitting the polling mode and returning to the notification mode.

2. The request-response based paravirtualized I/O system as in claim 1, wherein the request-response application is a web server or a database.

3. The request-response based paravirtualized I/O system as in claim 1, wherein the front-end drive module comprises: a front-end drive of a virtio network card; the back-end drive module comprises: a back-end drive of the virtio network card.

4. The request-response based paravirtualized I/O system as in claim 1, wherein the request-response application and the front-end drive module are located at a guest.

5. The request-response based paravirtualized I/O system as in claim 4, wherein the guest is a virtual machine.

6. The request-response based paravirtualized I/O system as in claim 1, wherein the back-end drive module is located at a host.

7. The request-response based paravirtualized I/O system as in claim 6, wherein the host is a virtual machine monitor.

8. The request-response based paravirtualized I/O system as in claim 1, wherein the back-end drive module corresponds to one I/O thread.

9. The request-response based paravirtualized I/O system as in claim 1, wherein the back-end drive module is configured to, when the system switches to the polling mode, disable a notification mechanism of the front-end drive module and initialize the polling count and handle the I/O request in the transmit queue.

10. The request-response based paravirtualized I/O system as in claim 1, wherein the back-end drive module, when performing the polling operation, is configured to handle the received packet and the I/O request in the transmit queue and poll the I/O request in the transmit queue.

11. The request-response based paravirtualized I/O system as in claim 1, wherein the back-end drive module, when performing the polling operation, is also configured to accumulate the polling count, then determine whether the polling count exceeds the set threshold, and in case of the polling count exceeding the set threshold, enable a notification mechanism of the front-end drive module, quit the polling mode and return to the notification mode.

12. A request-response based paravirtualized I/O method configuring a paravirtualized I/O system with two operating modes: a notification mode and a polling mode, the notification mode referring to, when a request-response application generates an I/O request, a front-end drive module writing the I/O request into a transmit queue and then notifying a back-end drive module, the back-end drive module acquiring the I/O request from the transmit queue and transmitting it to an external network via a physical network card, the polling mode referring to, when the request-response application generates the I/O request, the front-end drive module writing the I/O request into the transmit queue, the back-end drive module employing a polling operation to periodically detect the I/O request in the transmit queue, the system set to operate by default in the notification mode and, when the request-response application issues a connection establishment or service request, switch to the polling mode for operation, the operating mode switching step comprising:

S100: setting the system to operate by default in the notification mode;

S200: when the request-response application issues the connection establishment or service request, switching the system to the polling mode for operation;

S300: the back-end drive module performing the polling operation;

S400: the back-end drive module receiving a new packet from the external network via the physical network card and re-initializing a polling count; wherein the polling count is one selected from a total number of polling times and a count of timestamps;

S500: determining that the polling count reaches a set threshold, quitting the polling mode and returning to step S100.

13. The request-response based paravirtualized I/O method as in claim 12, wherein step S200 further comprises:

S201: the request-response application issuing the connection establishment or service request;

S202: the back-end drive module disabling a notification mechanism of the front-end drive module;

S203: the back-end drive module initializing the polling count; and

S204: the back-end drive module handling the I/O request in the transmit queue.

14. The request-response based paravirtualized I/O method as in claim 12, wherein step S300 further comprises:

S301: the back-end drive module handling the received packet;

S302: the back-end drive module handling the I/O request in the transmit queue;

S303: polling the I/O request in the transmit queue; and

S304: if there is the I/O request in the transmit queue, then handling it; if there is not, then accumulating the polling count.

15. The request-response based paravirtualized I/O method as in claim 12, wherein step S500 further comprises:

S501: the back-end drive module performing a polling operation and accumulating the polling count;

S502: determining the polling count;

S503: if the polling count has exceeded the set threshold, the back-end drive module enabling a notification mechanism of the front-end drive, quitting the polling mode and returning to step S100.

* * * * *